United States Patent [19]

Oshiage

[11] Patent Number: 4,649,486

[45] Date of Patent: Mar. 10, 1987

[54] CONTROL METHOD FOR CONTINUOUSLY VARIABLE TRANSMISSION OR THE LIKE

[75] Inventor: Katsunori Oshiage, Yokosuka, Japan

[73] Assignee: Nissan Motor Co., Ltd., Yokohama, Japan

[21] Appl. No.: 561,034

[22] Filed: Dec. 13, 1983

[30] Foreign Application Priority Data

Dec. 17, 1982 [JP] Japan .................... 57-220091
Dec. 28, 1982 [JP] Japan .................... 57-227374

[51] Int. Cl.$^4$ .................... B60K 41/12
[52] U.S. Cl. .................... 364/424.1; 74/866; 414/11; 318/635
[58] Field of Search .............. 364/424.1; 74/859, 865, 74/866; 474/11, 12, 17, 18; 318/616, 626, 635

[56] References Cited

U.S. PATENT DOCUMENTS

| | | | |
|---|---|---|---|
| 3,201,675 | 8/1965 | Curran et al. | 318/635 |
| 3,942,393 | 3/1976 | Forster et al. | 74/866 |
| 4,096,426 | 6/1978 | Tremaine et al. | 318/611 |
| 4,224,842 | 9/1980 | Rabus et al. | 74/866 |
| 4,246,526 | 1/1981 | Phillips | 318/626 |
| 4,322,669 | 3/1982 | Fukuma et al. | 318/626 |
| 4,428,257 | 1/1984 | Meyerle et al. | 74/866 |
| 4,458,560 | 7/1984 | Frank et al. | 74/866 |
| 4,459,878 | 7/1984 | Frank | 74/865 |
| 4,462,275 | 7/1984 | Mohl et al. | 364/424.1 |
| 4,466,521 | 8/1984 | Hattori et al. | 74/866 |

FOREIGN PATENT DOCUMENTS 0007739 9/1982 European Pat. Off. .
0073475 3/1983 European Pat. Off. .
0090450 6/1982 Japan .................... 474/11

OTHER PUBLICATIONS

Patent Abstracts of Japan, vol. 3, No. 53 (M-58), May 8, 1979, p. 49 M58.
Merz, L. "Grundkurs der Regelungstechnik," part A, B1963, pp. A/63-64.

Primary Examiner—Parshotam S. Lall
Attorney, Agent, or Firm—Schwartz, Jeffery, Schwaab, Mack, Blumenthal & Evans

[57] ABSTRACT

In order to prevent belt slippage induced by overly rapid depressurization of a chamber forming part of a continuously variable transmission V-belt pulley control arrangement, and simultaneously endow the transmission with good response characteristics, the difference between a value indicative of the desired gear radio (e.g., the desired gear ratio per se or the desired engine speed) and one indicative of the actual gear ratio, is produced, differentiated and added to itself. The maximum value of the addition is limited (by slicing or the like) and the result used to control the hydraulic pressure prevailing in the aforementioned chamber.

15 Claims, 16 Drawing Figures

FIG.6
(a) TARGET GEAR RATIO CHANGE
(b) TARGET/ACTUAL RATIO DIFFERENCE
(c) $E_o$
(d) $E_o - E_{-n}$
(e) $K_1 \cdot E_o + K_2 \cdot (E_o - E_{-n})$
UPPER CONTROL LIMIT "C"
(f) LIMITED SIGNAL

CONTROL METHOD FOR CONTINUOUSLY VARIABLE TRANSMISSION OR THE LIKE

BACKGROUND OF THE INVENTION

1. Field of the Invention

The present invention relates generally to method of controlling an automatic transmission and more specifically to a method of controlling a continuously variable transmission which induces optimal performance therein.

2. Description of the Prior Art

In a previously proposed continuously variable transmission of the type utilizing a V belt and continuously variable diameter sheaves (such as disclosed in Japanese Patent Application Provisional Publication No. Sho 57-90450 and more specifically in European Patent Publication No. 00 73 475a2 published on Mar. 9, 1983), the gear ratio is varied by computing the difference between a desired or target gear ratio and the actual ratio and operating a control device such a motor or the like, in a manner to reduce the difference. This motor has been set ot reduce the difference at the same relatively high rate, irrespective of the actual ratio of the transmission and as long as the difference exists, so as to endow good response characteristics on the arrangement. However, in case the pairs of frusto-conical cones defining each sheave are hydraulically linked with the above mentioned motor, a problem has been encountered in that pressure in the sheave control chamber being depressurized, tends to drop too rapidly allowing the V belt to slip undesirably.

This of course lowers the working life of the belt notably.

The disclosure of the above mentioned documents relating to the mechanical and hydraulic components thereof, is herein incorporated by reference thereto.

SUMMARY OF THE INVENTION

It is an object of the present invention to provided a transmission control method which controls a transmission in a manner to achieve the optimum response and life thereof.

The present invention in its broadest form comprises a method of controlling a transmission including the steps of: (a) producing a signal indicative of the difference between a first value indicative of a desired gear ratio and a second value indicative of the actual gear ratio, (b) differentiating the signal, (c) adding the signal produced in step (a) to the differential thereof produced in step (b), and (d) limiting the maximum value of the addition performed in step (c).

A more specific form of the invention is deemed to come in the use of the above mentioned method in controlling a continuously variable V belt transmission wherein the diameter of the variable diameter sheaves is varied in response to the outcome of the addition or the limited value thereof in the event that the addition produces a result greater than a predetermined value.

BRIEF DESCRIPTION OF THE DRAWINGS

The features and advantages of the arrangement of the present invention will become more clearly appreciated from the following description taken in conjunction with the accompanying drawings in which:

FIG. 6 (a-f) constitute a timing chart similar to that shown in FIG. 3 showing the wave forms which characterize the second embodiment.

DETAILED DESCRIPTION OF THE PREFERRED EMBODIMENTS

Figure 1:
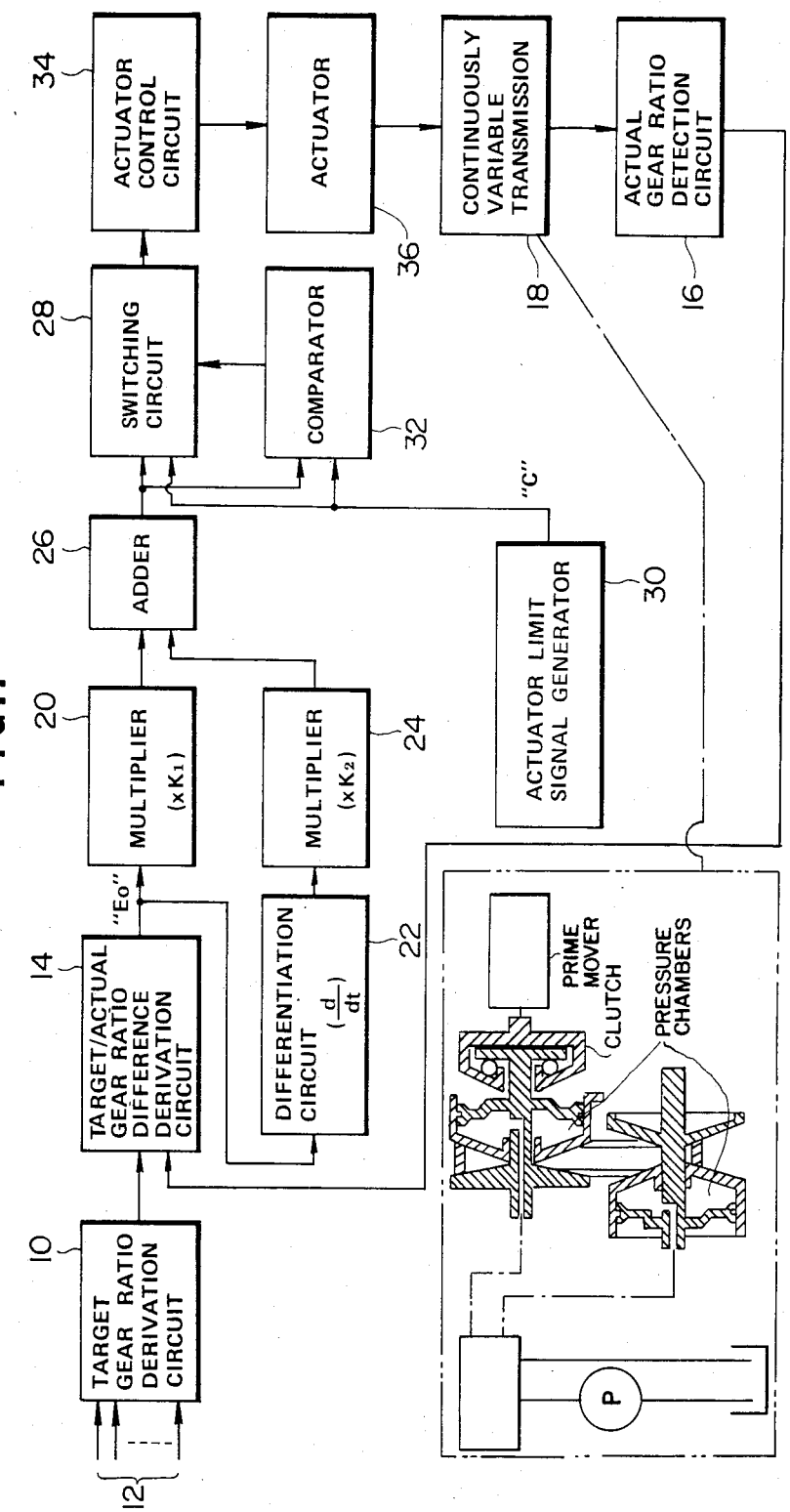
FIG. 1 is a schematic block diagram showing a circuit arrangement via which a first embodiment of the present invention may be executed.

Turning now to FIG. 1 a circuit arrangement suitable for executing a first embodiment of the present invention is schematically shown. This arrangement includes a "target" or "desired" gear ratio derivation circuit 10 which receives a plurality of inputs 12 such as engine speed, vehicle speed, throttle valve opening degree, and the like. This circuit 10 outputs a signal to a target/actual gear ratio difference derivation circuit 14 which also receives an input from an actual gear ratio detection circuit (or sensor) 16 associated with a continuously variable transmission 18 of the nature disclosed in the previously mentioned references. The difference derivation circuit 14 computes the difference between the two inputs and outputs a signal "Eo" indicative thereof, simultaneously to a multiplier 20 (wherein it is multipled by a first constant $K_1$) and a differentiating circuit 22. The output of the differentiating circuit 22 is fed to a multiplier 24 wherein it is multiplied by a second constant $K_2$. the outputs of the two multipliers 22, 24 are fed to an adder 26. The output of the adder 26 is fed to a switching circuit 28 along with a signal "C" generated by an actuator limit signal generator 30. The outputs of the adder 26 and the generator 30 are also fed to a comparator 32 which, upon sensing the magnitude of the output of the adder 26 exceeding that of the signal "C", triggers the switching circuit 28 in a manner to cause the signal "C" to be passed therethrough in place of the output of the adder 26, and to be outputted to an actuator control circuit 34. The latter metnioned circuit of course may take the form of a suitable amplifier or the like which boosts the level of the signal from the switching curcuit 28 a level suitable for operating an actuator 36 which in this instance may take the form of a solenoid valve, stepping motor or the like.

While the above described arrangement may be carried out using analog techniques (as will be apparent from FIG. 1), it is of course also possible to perform same using digital circuitry such as a microprocessor. In such a case, the differentiation is performed by subtracting a previous signal magnitude from the magnitude of the instant signal.

Figure 2:
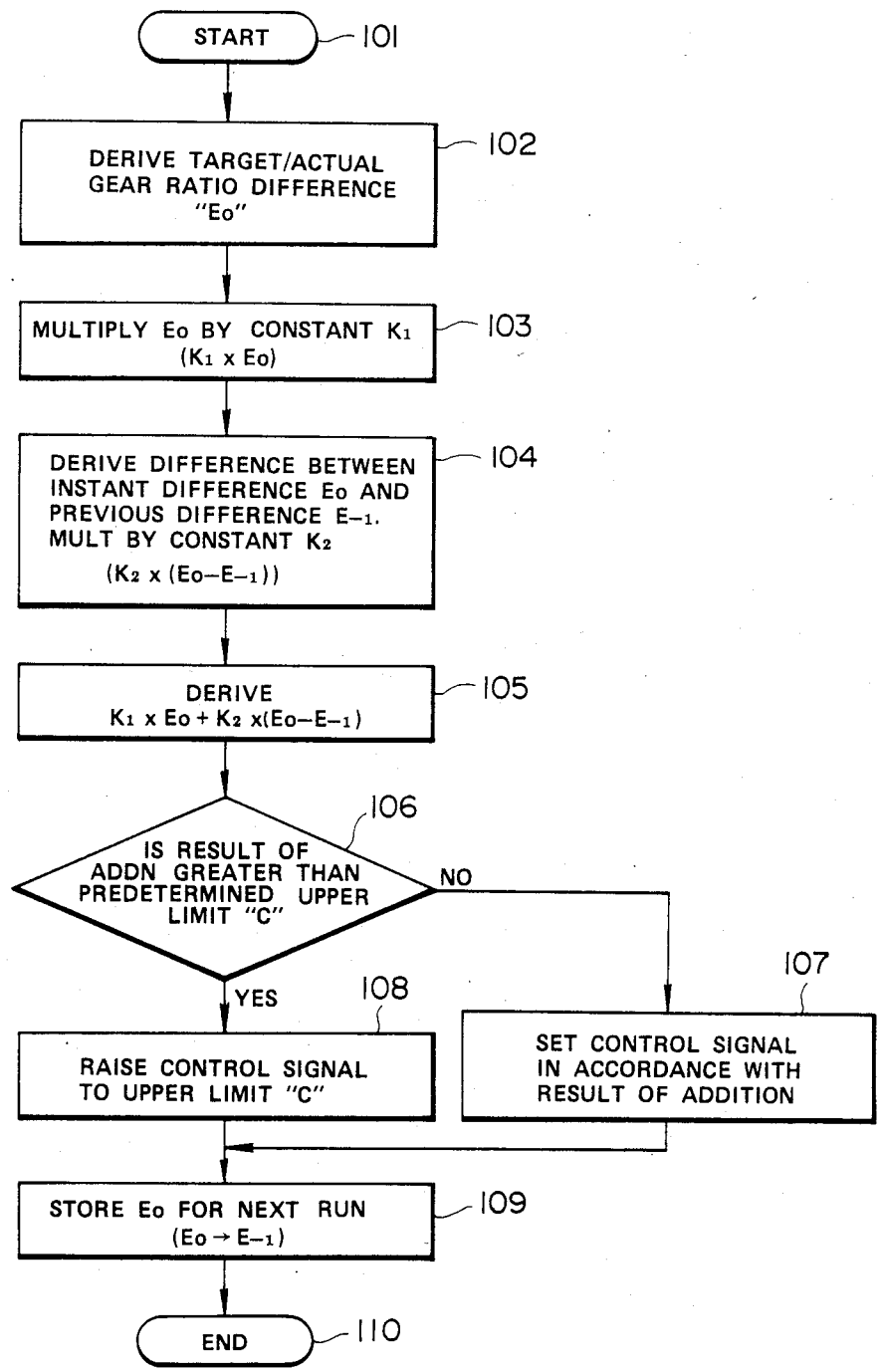
FIG. 2 is a flow chart showing the sequence of operations which characterize the first embodiment in the event that it is executed by digital circuitry such as a microprocessor.

FIG. 2 is a flow chart illutrating the characterizing steps of a microprocessor program which may be used to execute the functions of circuit blocks 10, 14 and 20 to 32.

In this program, following the START of the program at step 101, the appropriate data is read and the difference (Eo) between the actual gear ratio and that required, is derived at step 102 and subsequently multiplied by a first constant $K_1$ at step 103. At step 104 the differential of the signal "Eo" is derived by subtracting the value of the previous differenct ($E_{-1}$) from the instant value. The result is multiplied by a second constant $K_2$. In step 105 "$K_1 \times Eo$" and "$K_2 \times (Eo - E_{-1})$" are summed. The magnitude of the summation is compared in step 106 with a predetermined magnitude "C". In the event that the comparison indicates that the summation is lower than a predetermined maximum value "C", the program proceeds to step 107 wherein an actuator control signal is produced in accordance with the summation. This signal is fed to the actuator control unit 34. In the event that the summation is found greater than "C", then the value "C" is used in step 108 and thus determines the maximum level of the signal fed to the actuator controller 34. The value "C" is selected to correspond to the maximum rate at which the actuator may be induced to change the gear ratio of the transmission without belt slippage occuring.

In step 109 the value of $E_{-1}$ is updated to the value of Eo in preparation for the next program run which occurs following the END of the program in step 110.

Figure 3:
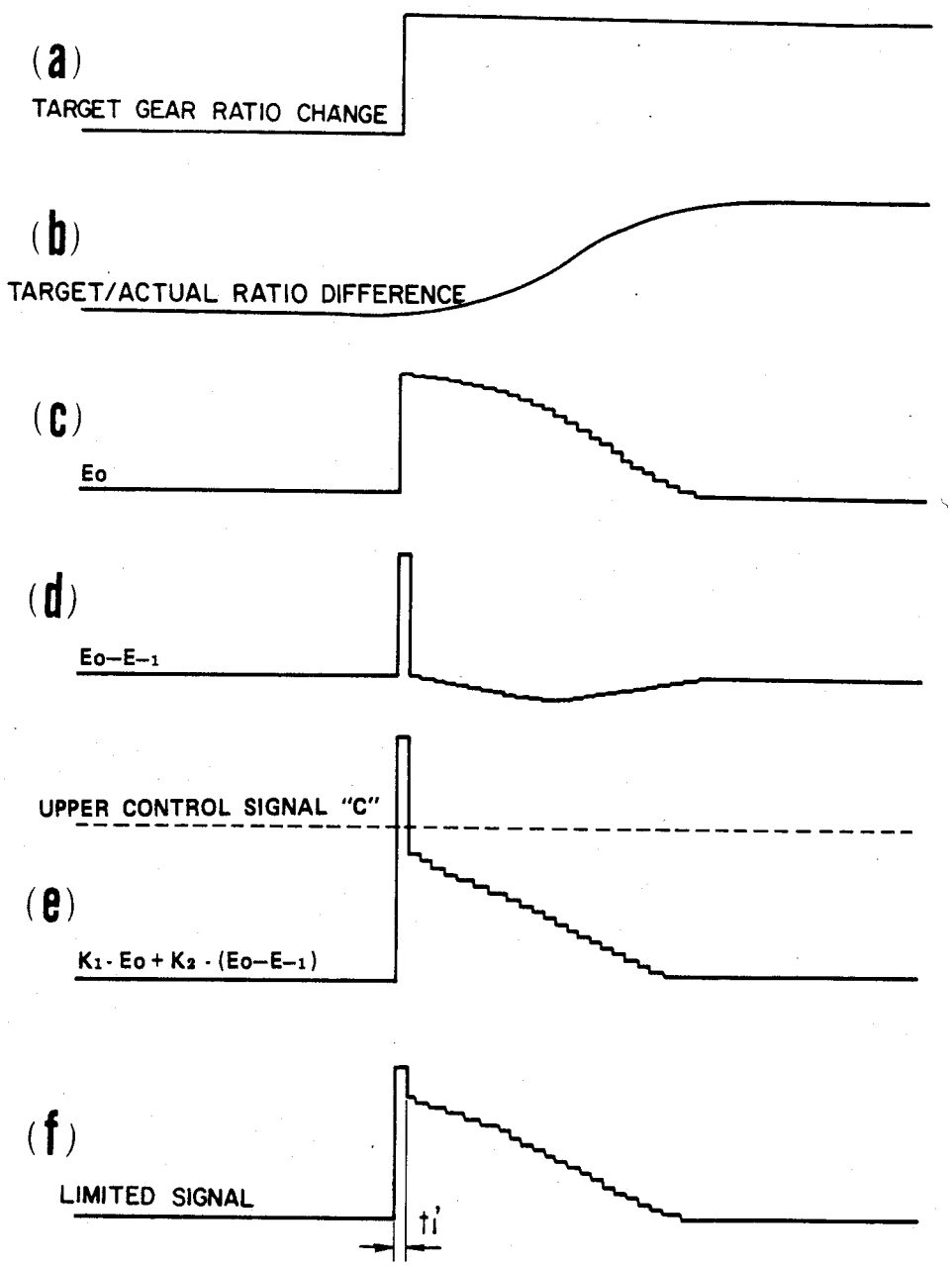
FIG. 3 (a-f) constitute a timing chart showing the wave forms which characterize the first embodiment.

FIG. 3 graphically shows in time chart form the operations which characterize first embodiment. In this figure chart (a) denotes the change in desired or target gear ratio, (b) indicates the difference between the desired and the actual gear ratios (viz., Eo), (c) shows the difference signal derived in step 103 (viz., $K_1 \times Eo$) and chart (d) shows the differential of Eo, (viz., $Eo - E_{-1}$).

As will be appreciated, on the first run of the program the value subtracted from Eo to derive the differential will be zero. On the second run the value of the preceeding signal will be, due to the very high rate of processing possible with a microprocessor, almost the same as the instant value and therefore after a time interval "$t_1$" (the time required for one program run) the value of the differential drops markedly. Chart (e) shows the addition of the signals shown in charts (c) and (d). As shown in chart (e) the upper level of this signal is limited at level "C". The result is shown in chart (f).

With the above arrangement it has been found that even though maximum rate at which the gear ratio may be varied is limited, the addition of the differential to the difference signal induces good response characteristics. Further, with the control provided by the present invention the operational characteristics of the transmission are improved due to the fact that the closer the actual gear ratio approaches the target value the slower the change becomes, whereby the transmission is theoretically maintained in a constant state of change and prevented from assuming a steady state.

Figure 4:
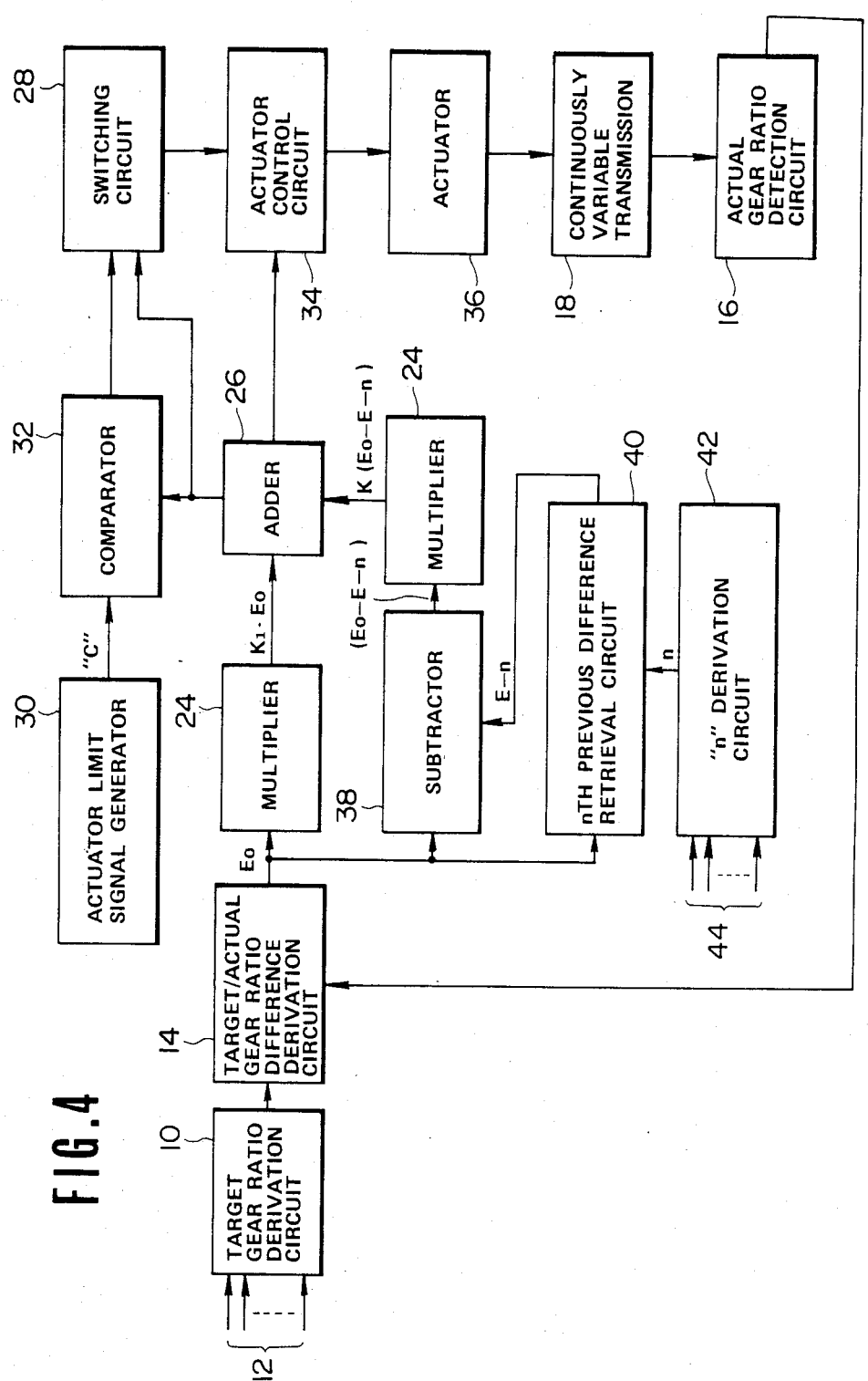
FIG. 4 shows in schematic block diagram form a circuit arrangement via which a second embodiment of the present invention may be executed.

FIG. 4 shows in schematic block diagram form a circuit arrangement suitable for executing a second embodiment of the present invention. This arrangement differs from that shown in FIG. 1 in that the differentiating circuit 22 is replaced with a subtractor 38, a memory device 40 which retrieves a "nth" previous signal value, and a circuit 42 responsive the various inputs 44 for determining the value of "n". The latter mentioned circuit may be arranged to assign "n" to a high value in the event that an accelerator pedal is sensed as being abruptly depressed or a transmission shift level moved from D range to L range, for example, and assign lower values in response to milder changes in demand parameters. With this arrangement the value subtracted from Eo may be varied in a manner to prolong the period for which the actuator is maintained at its maximum gear reduction speed and therefore further improve the response characteristics of the transmission.

Figure 5:
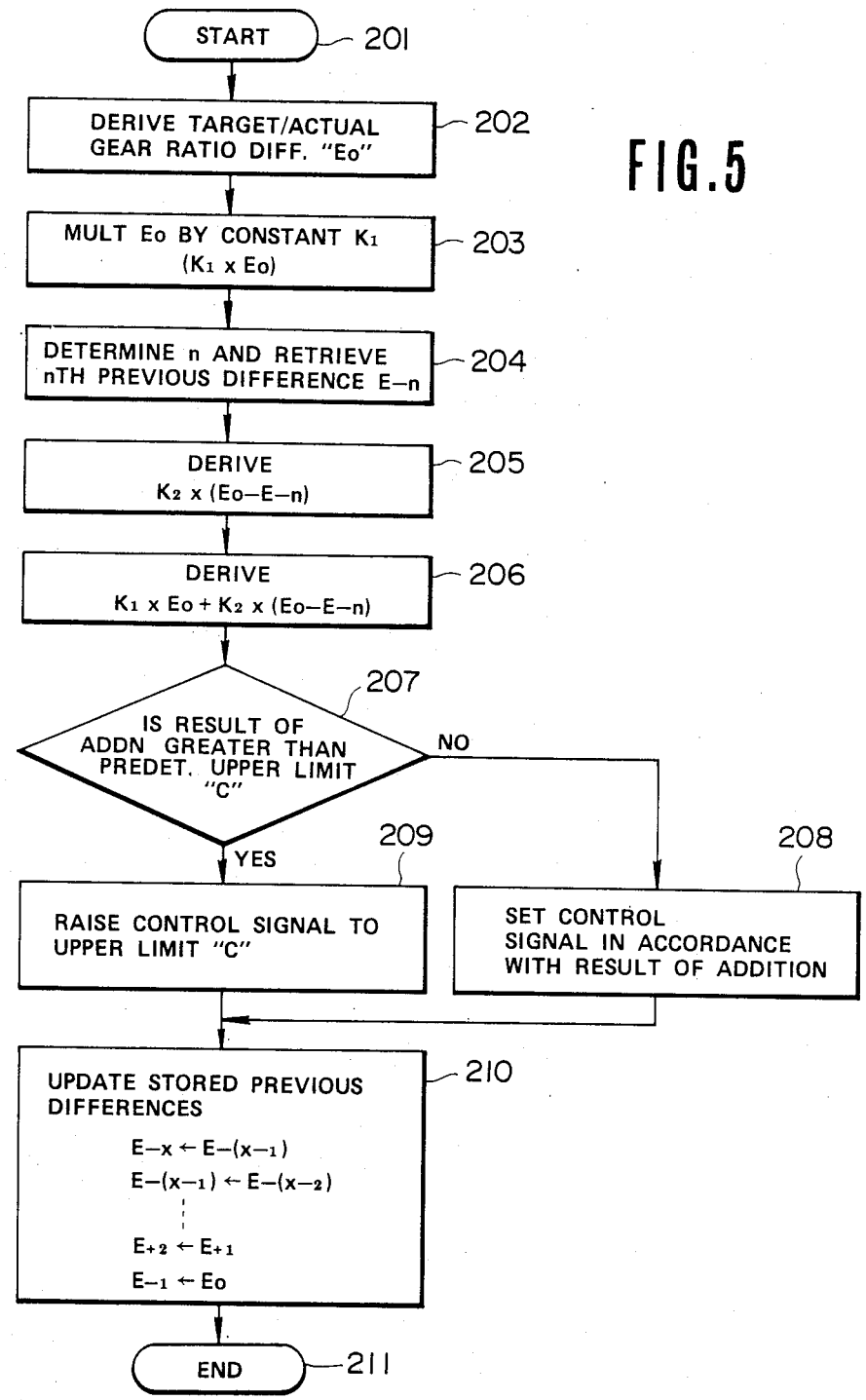
FIG. 5 is a flow chart showing the sequence of steps which characterize the second embodiment of the present invention in the event it is executed using a digital arrangement such as a microprocessor.

The operation of the second embodiment will become apparent from FIG. 5 which shows the characterizing steps of a microprocessor program adapted to perform the functions of circuit blocks 10, 14, 20 to 32 and 38 to 42, shown in FIG. 4. This program is similar to that disclosed in FIG. 2.

After the START of the program in step 201, a signal "Eo" indicative of the difference between the desired gear ratio and the actual gear ratio is derived and subsequently multiplied by a first constant $K_1$ at step 203. At step 204 "n" is determined and the appropriate memorized value (viz., $E_{-n}$) retreived from a memory. In step 205 the differential ($Eo - E_{-n}$) is derived and multiplied by a second constant $K_2$. Subsequent operations are identical with the corresponding ones of the FIG. 2 program except for the updating of "x" previous values of Eo in preparation for the next program run.

FIG. 6 is a time chart similar to that of FIG. 3. From this chart it will be clear that the larger the value of "n" the longer the value of the addition of Eo and the differential thereof tends to exceed the value "C" and therefore the longer the operation of the actuator 36 tends to be held at the maximum rate at which the gear ratio may be vaired without belts slippage occuring. Accordingly, the gear ratio change response characteristics of the transmission are improved as compared with the first embodiment. However, it is also possible to set "n" to a predetermiend value in the case it is desired to simplify the circuitry and/or computer program or when the variability of "n" is deemed unnecessary.

Even though the embodiments of the present invention have been disclosed in conjuction with a continuously variable type of transmission it will be obvious to one skilled in the art to which the present invention pertains that the concept underlying the instant invention may also be applied to conventional staged transmissions.

It should be noted that in the case of a continuously variable transmission it is possible to use engine speed inplace of the gear ratio parameter if so desired. This is because the speed changing ratio and the engine speed are in a predetermined relationship in the case that the vehicle speed is constant.

What is claimed is:

1. In a method of controlling a transmission the steps comprising:
   (a) producing a signal indicative of the difference between a first value indicative of a desired gear ratio and a second value indicative of the actual gear ratio;
   (b) differentiating said signal;
   (c) adding the signal produced in step (a) to the differential thereof produced in step (b); and
   (d) limiting the maximum value of the addition performed in step (c).

2. A method as claimed in claim 1, further comprising the steps of:
   (e) multiplying the signal produced in step (a) by a first constant; and
   (f) multiplying the differential obtained in step (b) with a second constant.

3. A method as claimed in claim 1, wherein said step of differentiating is carried out by:

(g) memorizing the magnitude of a previous signal; and (h) subtracting said memorized magnitude from the magnitude of the instant signal.

4. A method as claimed in claim 1, wherein the step of differentiating is performed by:

(i) memorizing a plurality of previous signal magnitudes;

(j) selecting one of the memorized magnitudes in response to a parameter which varies with the transmission environment;

(k) subtracting the selected magnitude from the magnitude of the momentarily produced signal; and (l) updating said memorized signal magnitudes per differentiation.

5. In a transmission:

first means for producing a signal indicative of the difference between a first value indicative of a desired gear ratio and a second value indicative of the actual gear ratio;

second means for differentiating said signal;

third means for adding the signal produced by said first means to the differential thereof produced by said second means; and fourth means for limiting the maximum value of the addition performed by said third means.

6. A transmission as claimed in claim 5, wherein said first means includes circuitry for multiplying said signal by a first constant and said second means includes circuitry for mulitplying the differential produced thereby by a second constant.

7. A transmission as claimed in claim 5, wherein said first means includes an arrangement for:

(a) memorizing the magnitude of a previous signal; and (b) subtracting said memorizing magnitude from the magnitude of the instant signal.

8. A transmission as claimed in claim 5, wherein first means includes an arrangement for:

memorizing a plurality of previous signal magnitudes, selecting one of the memorized magnitudes in response to a parameter which varies with the transmission environment, subtracting the selected magnitude from the magnitude of the momentarily produced signal, and updating said memorized signal magnitudes per differentiation.

9. In a continuously variable transmission having a device associated with said transmission for varying the gear ratio thereof;

an apparatus for controlling said device;

sensor means for sensing a parameter indicative of the actual gear ratio and one indicative of the desired gear ratio; and a control arrangement for controlling said apparatus, said control arrangement including electronic means responsive to said sensor means;

a method of controlling said transmission comprising the step of;

(a) producing a signal indicative of the difference between a first parameter indicative of a desired gear ratio and a second parameter indictive of the actual gear ratio;

(b) differentiating said signal;

(c) addition the signal produced in step (a) to the differential thereof produced in step (b); and (d) limiting the maximum value of the addition performed in step (c).

10. In a continuously variable transmission a device associated with said transmission for varying the gear ratio thereof;

an apparatus for controlling said device;

sensor means for sensing a parameter indicative of the actual gear ratio and one indicative of the desired gear ratio; and a control arrangement for controlling said apparatus, said control arrangement including electronic means responsive to said sensor means for:

(a) producing a signal indicative of the difference between a first parameter indicative of a desired gear ratio and a second parameter indicative of the actual gear ratio;

(b) differentiating said signal;

(c) adding the signal produced in step (a) to the differential thereof produced in step (b); and (d) limiting the maximum value of the addition performed in step (c).

11. A transmission as claimed in claim 10, wherein said device comprises:

first and second variable diameter sheaves interconnected by a belt, said first and second sheaves each comprising a pair of frusto-conical members biased toward each other by a hydraulic pressure prevailing in a control chamber associated with each pair of members, and wherein said apparatus comprises:

a source of hyraulic fluid under pressure; and a valve interposed between said source and the control chambers associated with said variable diameter sheaves for controlling the hydraulic pressure prevailing in said chambers.

12. A transmission as claimed in claim 10, wherein said control arrangement includes a microprocessor which is programmed to perform the signal producing, differentiating, adding and limiting functions.

13. A transmission as claimed in claim 12, wherein said microprocessor performs said differentiating function by subtracting a memorized previous signal magnitude from the magnitude of the instant signal, and updates the memorized previous signal magnitude data per differentiation.

14. In a continuously variable transmission:

a first variable diameter pulley;

a first presure chamber for controlling the diameter of said first pulley;

a second variable diameter pulley;

a second pressure chamber for controlling the diameter of said second variable pulley;

a flexible member operatively interconnecting said first and second variable diameter pulleys;

means for selectively supplying fluid under pressure into said first and second pressure chambers in a manner to vary the diameter of said pulleys and thus the gear ratio produced thereby; and means for limiting the maximum rate at which the pressure in said first and second pressure chambers can be reduced and thereby preventing slippage between said first and second variable diameter pulleys and said flexible member.

15. A continuously variable transmission according to claim 14, wherein said limiting means comprises means for providing a signal indicative of an actual reduction ratio of said transmission, means for providing a signal indicative of a desired reduction ratio of said transmission, means for subtracting said actual and desired reduction ratio signals to produce a difference signal, means for differentiating said difference signal to produce a differentiated signal, means for addition said difference signal and said differentiated signal to produce a control signal, and means for maintaining said control signal below a predetermined maximum.

* * * * *